United States Patent [19]
Pereman

[11] 3,797,340
[45] Mar. 19, 1974

[54] GLASS CUTTING DEVICE
[75] Inventor: Gordon F. Pereman, Columbus, Ontario, Canada
[73] Assignee: PPG Industries Inc., Pittsburgh, Pa.
[22] Filed: Jan. 3, 1973
[21] Appl. No.: 320,829

[30] Foreign Application Priority Data
Oct. 10, 1972 Canada .................................. 153551

[52] U.S. Cl........................ 83/12, 33/27 K, 83/565, 83/582, 83/698, 225/96.5
[51] Int. Cl........ B26d 3/08, B26d 7/26, C03b 33/04
[58] Field of Search ............ 83/12, 11, 6, 565, 582, 83/698; 225/96.5; 33/27 K

[56] References Cited
UNITED STATES PATENTS
2,612,689  10/1952  Kirkman et al. ..................... 33/27 K

*Primary Examiner*—Frank T. Yost
*Attorney, Agent, or Firm*—Cushman, Darby & Cushman

[57]  ABSTRACT

A scoring machine includes a template and follower assembly for guiding a scoring head along a predetermined path over a work piece to score the work piece along a predetermined path. Means are provided for controlling and damping fish-tailing motion of the castor-mounted cutting wheel thus making it possible to achieve higher scoring speeds than would otherwise be permitted. This "fish-tailing" motion is controlled or damped by means which provides spring biasing of the scoring wheel mount only within the arc necessary for normal operation of the castor scoring wheel; should the castor scoring wheel be inadvertently moved beyond or outside of this arc of normal operation, the damping means is designed such that the spring does not become overstressed or broken and also so that the scoring wheel and its mounting arrangement can readily be pivoted back to the correct position.

9 Claims, 9 Drawing Figures

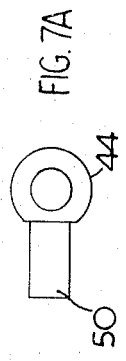
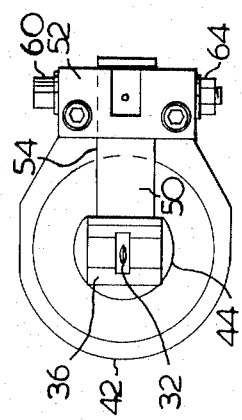
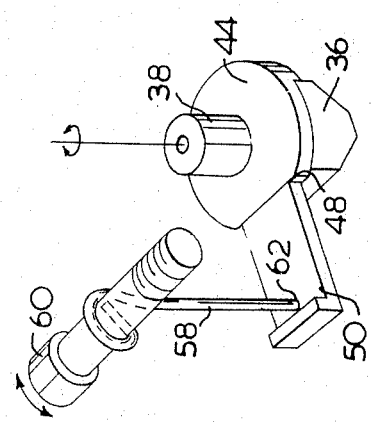
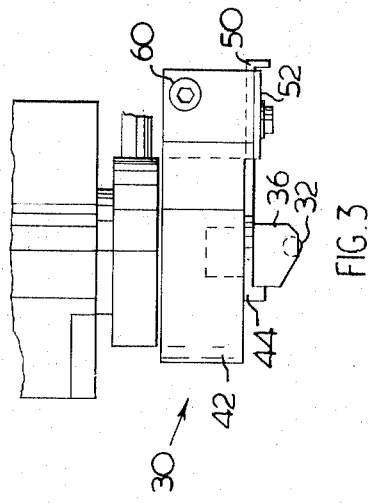
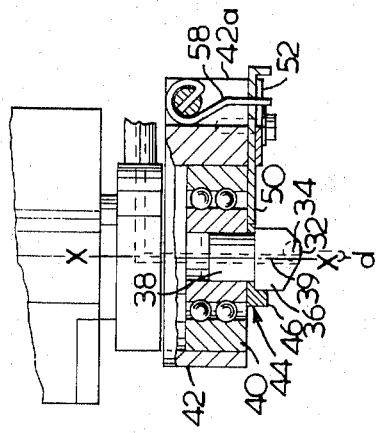

GLASS CUTTING DEVICE

BACKGROUND OF THE INVENTION

This invention relates to improvements in scoring machines for glass and the like which include a template and follower assembly for guiding a scoring head along a predetermined path over a work piece whereby to score the work piece along the predetermined path.

It is well known that the scoring head of a glass scoring machine can be moved along the template at a rate of speed which is higher in regions where the predetermined path of travel of the scoring head is either straight or shallowly curved than in regions where the path of travel is relatively sharply curved. Various systems have been devised for varying the speed of the scoring head in accordance with the configuration of the template in an effort to achieve optimum production rates, one such system being described in U.S. Pat. No. 2,763,928 issued Sept. 25, 1956 to Harry A. Smith, Jr. and assigned to Pittsburgh Plate Glass Company (now named PPG Industries, Inc.).

Because of the intricate outline shapes desired for many glasses, it has been found necessary to mount the glass scoring wheel to the body of the scoring head via a freely swivelling caster-type arrangement to permit the wheel to run parallel to the guide surface defined by the template at all times. While this arrangement works well at slow to medium speeds, there is a tendency for the scoring wheel to wobble or "fish-tail" at high speeds and cause a corresponding wobbly score mark in the glass. This undesirable effect is especially pronounced when the cutting device is traversing a sharp change in direction and during its transition into a relatively straight path, and is also present at high speeds along straight paths. This, of course, tends to place limits on the permissible maximum speeds of the scoring head both when traversing sharp curves and also when travelling along high speed straightaways which, in turn, limit somewhat the output of the scoring machine.

Reference is made in the prior art to various ways of controlling the movement of the swivelling castor type mount. For example, Morris in U.S. Pat. No. 2,595,402 of May 6, 1952, col. 6 at lines 40-64 refers to the use of stop elements to limit the degree of angular movement of the swivelling castors and thus retain the cutting wheels in approximate parallelism with the path of cut when they are out of the cutting position. These stop members would not, however, appear to greatly influence the behaviour of the cutting wheels after actual scoring has commenced. Kuntz, in U.S. Pat. No. 2,746,153 of May 22, 1956 and Kirkman et al. in U.S. Pat. No. 2,612,689 of Oct. 7, 1952 also makes reference to problems of slurring or irregularity in depth of cut as the scoring head moves around small radius bends due to the tendency of the cutter wheel to be dragged along at times at an angle to its intended path of travel. Kirkman et al employ a retarding element or cushioned brake member to reduce the speed of the cutting unit as it navigates corner areas while Kuntz employs a control system for accelerating or decelerating the cutting tool in sharply curved portions of the travel path. However, none of these patents appear to suggest the use of means directly operatively connected to the scoring wheel mount to control its motion.

SUMMARY OF THE INVENTION

The present invention provides means operatively connected to the scoring wheel mounting arrangements for controlling and damping this motion of the castored cutting wheel thus making it possible to achieve higher scoring speeds than would otherwise be permitted without incurring wobbly score marks on the glass.

Thus, in accordance with one aspect of the invention there is provided glass scoring apparatus comprising, means for supporting a sheet of glass, a template defining a predetermined path of travel, a scoring head arranged to travel along said template and having a glass scoring means thereon for scoring the sheet of glass along a line corresponding to the path of travel, said scoring means being mounted to said scoring head via a swivelling mounting means to provide a castoring action for said scoring means; said mounting means having a tendency to fish-tail or wobble at high speeds of the scoring head along the path of travel, and means operatively associated with said mounting means for reducing the tendency of said mounting means to fish-tail or wobble at high speeds whereby to reduce the incidence of wobbly score marks on the glass.

In the preferred form of the invention the "fish-tailing" motion is controlled or damped by means which provides spring loading only within the arc necessary for normal operation of the castored scoring wheel; should the castored scoring wheel be inadvertently moved beyond or outside of this arc of normal operation, the damping means is designed such that the spring does not as a result of this become overstressed or broken and also so that the scoring wheel and its mounting arrangement can easily be pivoted back to the correct position either by virtue of contact of the scoring wheel with the glass or by manual manipulation of the scoring wheel mount.

BRIEF DESCRIPTION OF THE VIEWS OF DRAWINGS

The various features of the invention will be better understood from the following description of a preferred embodiment taken in conjunction with drawings wherein:

FIG. 3 is an elevation view of a castored cutting wheel assembly according to the invention;

FIG. 4 is a partial cross-section elevational view of the structure of FIG. 3;

FIG. 5 is a view of the bottom of the assembly of FIG. 3;

FIG. 6 is a perspective view illustrating certain of the basic features of the device;

FIGS. 7A-7C are diagrammatic views further illustrating the operation of the invention;

DETAILED DESCRIPTION

Figure 1:
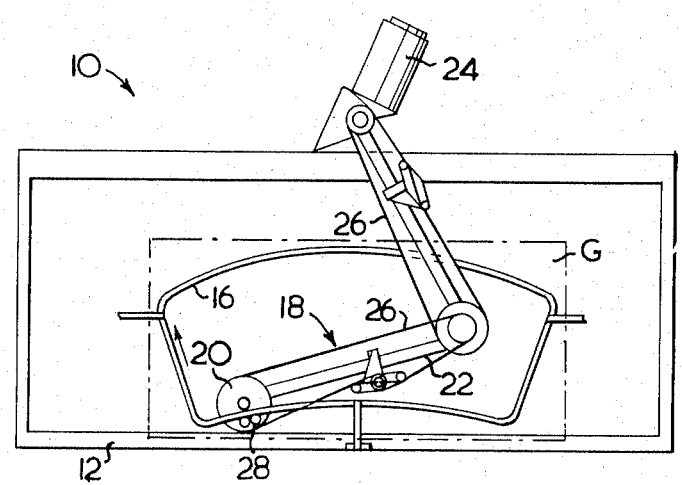
FIG. 1 is a plan view of a glass scoring device incorporating the principles of the invention.
Figure 2:
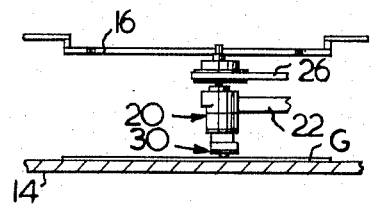
FIG. 2 is a fragmentary elevation view of the device of FIG. 1.

The glass scoring machine 10 shown in FIGS. 1 and 2 includes a main frame 12 including a support or table 14 over which flat sheets of glass G are conveyed. Suitable stop and alignment means (not shown) which are well known in the art, serve to properly align and position the individual sheets for scoring along a predetermined path.

Positioned above table 14 is a template 16 having an outline configuration corresponding to the desired path of the score mark on the glass sheet.

A scoring head assembly 18 including a scoring head 20 arranged to travel around the template is provided. Scoring head 20 is connected to frame 12 via an articulated arm assembly 22 and is driven along template 16 from motor 24 via drive belts 26 and small drive rolls 28 which engage the edges of the template in conventional fashion. Suitable control circuitry (not shown) is provided to vary the speed of travel of the scoring head 20 along the template whereby to speed up the scoring head 20 along straight or shallowly curved sections and to slow it down in the corners all as suggested by the aforementioned Smith Jr. patent.

At the lower end of the scoring head 20 there is provided a castored scoring wheel assembly 30 which is shown in FIGS. 3–5. This assembly carries a glass scoring wheel 32 of any suitable design, the latter being mounted for rotation about a horizontal axis 34 in a wheel mounting block 36. The mounting block 36 includes an upwardly projecting post 38 which extends upwardly into a ball bearing assembly 40, the latter being supported in a housing 42 secured to the lower end of the scoring head. Passageway 39 is used to supply a cutting fluid to the scoring wheel. Post 38 and bearing assembly 40 define a vertical pivot axis X—X for wheel mounting block 36, which pivot axis X—X is spaced a short distance "d" from the rotation axis 34 of the scoring wheel 32 whereby to provide the necessary castoring action. Thus, as the entire scoring head assembly is moved along the template 16, the freely castoring scoring wheel 32 follows the intended path of score.

In accordance with the invention, means are provided to reduce the tendency of the castored scoring wheel 32 to "fish-tail" at high speeds. It will be seen that a disc 44 is mounted on the wheel mounting block 36 and is locked for rotation therewith by means of a ledge 46 which bears against a flat surface provided on the mounting block, with post 38 projecting upwardly through an aperture located centrally of disc 44. The outer periphery of disc 44 is circular save for a flat or straight peripheral section 48 which is located in diametric opposition to the previously mentioned ledge 46.

A slide plate 50 is slidably mounted in a shallow groove 54 in the bottom of housing 42 and is retained there by means of a retainer plate 52. Groove 54 is oriented such that plate 50 is slidable towards and away from the scoring wheel mounting block 36 in a path which intersects vertical pivot axis X—X. Plate 50 has a straight end portion 56 which is adapted to abut the flat peripheral section 48 of disc 44. When straight end portion 56 is in full abutting contact with flat section 48, the scoring wheel is in its normal position for movement in a path parallel to the path of travel of the scoring head.

Plate 50 is resiliently biased toward disc 44 on wheel mounting block 36 at all times by means of a spring 58 which in this case is of music wire having a diameter of about 0.030 inch and an overall length of one inch. The upper end of this spring 58 passes through a hole extending diametrically through a spring adjusting bolt 60 which passes through the housing 42 while the lower end of this spring extends into an aperture 62 disposed in slide plate 50. The bolt 60 is adjusted angularly such that spring 58, which wraps partly around the bolt 60 urges plate 50 towards ring 44 and into light pressure contact with the flat section 48 of the disc 44. A lock nut 64 on the end of adjustment bolt 60 is tightened to prevent rotation of the latter after the spring 58 has been adjusted to exert the required pressure on plate 50.

In one embodiment according to the invention, the mounting block was arranged such that the distance "d" between the vertical axis X—X as shown in FIG. 4 and the scoring wheel rotation axis was about 1/16 inch. The disc 44 had an outside diameter of ¾ inch and was perfectly circular save for a flat peripheral section ½ inch in length. A slide plate 50 having a width of ½ inch was biased against the disc 44 as shown in the drawings by a music wire spring which, in operation, could be adjusted to exert a pressure on the slide plate in the range of 3 to 12 oz. with a preferred pressure of about 6 oz.

The operation of the arrangement above described will be evident from FIGS. 6 and 7A–7C. In FIGS. 6 and 7A the end of the plate is in full abutting contact with the flat peripheral section 48 of disc 44 with the mounting block in the "home" position for scoring wheel travel parallel to the path of travel defined by the template. Any attempt to rotate the scoring wheel mounting block within the arc necessary for normal operation of the scoring wheel will tend to cause movement of the slide plate 50 away from the mounting block in opposition to the direction of the biasing force exerted by the spring 58 as shown in FIG. 7B. Hence, there is a tendency for the scoring wheel mounting block to return to the normal or "home" position and to resist fish-tailing as described previously. Thus, higher scoring speeds are permitted. Should, however, some abnormality occur, e.g. a pile-up of glass at the cutting station, such that a relatively large twisting force is applied to the scoring wheel and its mounting block, then the mounting block and disc 44 will simply rotate through an angle larger than the arc necessary for normal operation of the device so that the circular portion of the periphery of the disc 44 contacts slide plate 50 as shown in FIG. 7C in which event there is no force present tending to return the mounting block to the "home" position. Because of the design of the device, no damage to the scoring device or overstressing of the spring 58 should occur and the mounting block and scoring wheel can easily pivot back to the normal operating position either by virtue of contact of the scoring wheel with the glass or by manually rotating this assembly back to its normal position.

I claim:

1. Glass scoring apparatus comprising:
   a. means for supporting a sheet of glass;
   b. a template defining a predetermined path of travel;
   c. a scoring head arranged to travel along said template and having a glass scoring means thereon for scoring the sheet of glass along a line corresponding to the path of travel;
   d. said scoring means being mounted to said scoring head via a swivelling mounting means to provide a castoring action for said scoring means; said mounting means having a tendency to fish-tail or wobble at high speeds of the scoring head along the path of travel, and e. means operatively associated with said mounting means for reducing the tendency of said mounting means to fish-tail or wobble at high speeds whereby to reduce the incidence of wobbly score marks on the glass.

2. Glass scoring apparatus according to claim 1 wherein said means for reducing fish-tailing or wobbling motion includes spring biasing means for resiliently urging said mounting means to a predetermined position for travel of the scoring means in a path parallel to said predetermined path of travel.

3. Glass scoring apparatus according to claim 2 wherein said means for reducing the fish tailing motion includes means associated with the spring biasing means to effect said resilient urging of the mounting means to said predetermined position only within a predetermined arc of movement of the mounting means.

4. Glass scoring apparatus according to claim 3 wherein the scoring means comprises a scoring wheel.

5. Glass scoring apparatus according to claim 3 wherein said scoring means comprises a scoring wheel and wherein the means associated with the spring biasing means includes means rotatable with said swivelling mounting means and having a predetermined surface configuration adapted to cooperate with the spring biasing means to resiliently urge the mounting means to the predetermined position only within said predetermined arc of movement of the mounting means.

6. Glass scoring apparatus according to claim 5 wherein the means rotatable with the mounting means comprises means having a circular surface portion and a further surface portion, the spring biasing means including a spring and additional means urged thereby into contact with one or other of said surface portions depending on the angular position of the swivelling mounting means, with said further surface portion and said additional means being configured such that when they are in contact with one another the mounting means is continually urged toward said predetermined position.

7. Glass scoring apparatus according to claim 6 wherein the means rotatable with the mounting means comprises a ring having said circular surface portion and said further surface portion, said further surface portion and said additional means both having a straight or flat configuration such that as the ring rotates within said predetermined arc the additional means is caused to move towards and away from the mounting means against the action of the spring.

8. Glass scoring apparatus according to claim 7 wherein said additional means comprises a plate mounted for sliding movement towards or away from the mounting means for the scoring wheel.

9. Glass scoring means according to claim 7 including means for adjusting the tension of said spring.

* * * * *